United States Patent [19]

Bromley et al.

[11] Patent Number: 5,327,645

[45] Date of Patent: * Jul. 12, 1994

[54] TEE-NUT FASTENER FEED MEANS FOR TEE-NUT FASTENER SETTING APPARATUS

[76] Inventors: Keith G. Bromley, Brownlee Drive, Bradford, Ontario; Walter H. Leistner, 97 Alamosa Drive, Toronto Ontario, both of Canada

[ * ] Notice: The portion of the term of this patent subsequent to Jun. 1, 2010 has been disclaimed.

[21] Appl. No.: 44,496

[22] Filed: Apr. 9, 1993

Related U.S. Application Data

[63] Continuation-in-part of Ser. No. 687,167, Apr. 18, 1991, Pat. No. 5,214,843.

[51] Int. Cl.[5] .............................................. B23Q 7/10
[52] U.S. Cl. ........................................ 29/809; 227/16; 221/71
[58] Field of Search .................. 29/798, 809, 282, 432; 227/16, 114, 154; 221/70, 71, 72, 74; 206/340, 338, 397, 398, 413–416, 497

[56] References Cited

U.S. PATENT DOCUMENTS

| 2,056,180 | 10/1936 | Flood . | |
|---|---|---|---|
| 2,079,005 | 5/1937 | Freydberg | 221/70 |
| 2,322,538 | 6/1943 | Muther | 29/468 |
| 3,460,217 | 8/1969 | Leistner . | |
| 3,556,743 | 1/1971 | Yeager . | |
| 3,810,290 | 5/1974 | Grabe . | |
| 3,811,171 | 5/1974 | Grabe . | |
| 4,224,731 | 9/1980 | Lingle . | |
| 4,821,940 | 4/1989 | Rotherham . | |
| 5,214,843 | 6/1993 | Bromley et al. | 29/798 |

FOREIGN PATENT DOCUMENTS

583977 5/1989 Australia .

*Primary Examiner*—Mark Rosenbaum
*Assistant Examiner*—David P. Bryant

[57] ABSTRACT

Tee-nut support assembly to supply Tee-nuts to the driver device of a Tee-nut setting apparatus, and a package of rolled Tee-nuts connected in a strip for such apparatus.

7 Claims, 7 Drawing Sheets

TEE-NUT FASTENER FEED MEANS FOR TEE-NUT FASTENER SETTING APPARATUS

This application is a continuation-in-part of application Ser. No. 07/687,167, filed Apr. 18, 1991, now U.S. Pat. No. 5,214,843 entitled FASTENER SETTING APPARATUS AND METHOD AND FASTENER STRIP THEREFOR, inventors Walter H. Leistner and Keith G. Bromley.

FIELD OF THE INVENTION

The invention relates to a Tee-nut feed apparatus for use with a Tee-nut setting apparatus used for setting threaded Tee-nuts in a workpiece, and to a rolled package of such Tee-nut for such feed apparatus.

BACKGROUND OF THE INVENTION

Threaded fastening devices known as Tee-nuts are widely used in the furniture and other industries for securing components of for example furniture together. Such Tee-nuts are formed of sheet metal, and incorporate a threaded sleeve or barrel, and an integral face flange, and spikes, which are embedded in the workpiece around a pre-drilled hole. They are used, for example, in the construction of beds, for securing legs to various furniture items.

Various forms of apparatus have been devised for the power-operated setting of such Tee-nuts at a high rate of speed. One example of such a Tee-nut setting apparatus is shown in U.S. Pat. No. 3,460,217.

The apparatus disclosed in that patent has operated satisfactorily for many years. In that apparatus, the workpiece was first of all placed on a lower working surface. Tee-nuts were fed from a hopper down a curved ramp, to a power-operated setting plunger located above the workpiece. The Tee-nut was held in registration with the bottom of the plunger, and when the plunger was operated downwardly the Tee-nut was released, and the plunger struck the Tee-nut forcing it downwardly into a hole in the workpiece.

One problem in the design of such earlier machines was that they required the use of a hopper, and a relatively expensive feed mechanism, for feeding the loose Tee-nuts. These requirements added to the complexity and hence the expense of such earlier apparatus. These factors had, in turn, limited the scope of the sales of such machines. In practice, they were economical only for relatively large scale manufacturing facilities.

A further proposal is shown in U.S. Pat. No. 4,821,940, granted to Allan C. Rotherham entitled Tee-nut Insertion Machine.

In this machine, a hopper and feed mechanism generally similar to that shown in earlier Tee-nut setting machines, was used. However, in this machine, the Tee-nuts were fed to a feed mechanism from which they were delivered one at a time to a plunger. The plunger in this case operated with an upward insertion stroke, so that the Tee-nut was forced upwardly into the workpiece.

Above the workpiece, a stationary anvil or support was located against which the workpiece was held, while the Tee-nut was forced upwardly. In this device, however, the Tee-nuts were simply placed loose in the hopper as in the earlier devices, and as a result, it was necessary to provide for a two position delivery system for delivering the Tee-nuts to the plunger.

The Tee-nuts were thus delivered to a preliminary delivery location, at which point they stopped. The endmost tee-nut was then moved over a step by a piston, one at a time, from the preliminary location, to the so-called extended location, in which position it was then held ready for insertion by the plunger.

Clearly, if a feed mechanism could be designed at a much lower cost and, in particular, without the use of an expensive and complex hopper and feed mechanism, and without the hopper and two-step feed mechanism of U.S. Pat. No. 4,821,940 then the sales of such a machine could be made on a much larger scale, to a much greater range of customers.

The setting machine may operate on the method of upward insertion of Tee-nuts, into a work-piece from below the work-piece, or by moving each Tee-nut downwardly, and in either case the feed mechanism will produce significant advantages over earlier systems.

Preferably also, the invention will provide for a new and unique package of such Tee-nuts arranged in a strip, for easy handling, and positioning in such a feed apparatus.

BRIEF SUMMARY OF THE INVENTION

With a view to overcoming the various disadvantages noted above the invention comprises a feed apparatus for use with a Tee-nut setting apparatus having Tee-nut driver means, said feed apparatus supporting a rolled strip of Tee-nuts and feeding the strip of Tee-nuts to said driver means said Tee-nuts having sleeve portions adapted to be embedded in said workpiece and integral face flanges extending from said sleeve portions and adapted to lie on a surface of said workpiece, and said strip having means engaging said face flanges to join said Tee-nuts into said strip, and wherein said feed apparatus comprises rotatable support means for supporting said rolled strip of Tee-nuts and feed means for transmitting same from said rotatable support means to said driver means.

The invention further provides such a feed apparatus wherein said rotatable support means includes a rotary support table for supporting said roll of Tee-nuts with said Tee-nuts on edge, and means for rotatably mounting said support table whereby the same can rotate as the strip is fed to the driver means.

The invention further provides such a feed apparatus wherein said rotary support table comprises a generally flat planar table, and bearing means rotatably supporting said table for rotation in a generally horizontal plane, and feed slide means overlying said table, but being unattached thereto whereby said table is free to rotate independently of said feed slide means.

The invention further provides such a feed apparatus wherein said strip of Tee-nuts is formed into a roll adapted to lie on said table with said Tee-nuts on edge and including means for advancing said strip along said feed slide means in timed relation to the operation of said driver means.

The invention further provides such a feed apparatus wherein said Tee-nuts in said roll are adapted to lie with edges of said face flanges lying on said table with said sleeves oriented substantially horizontally, and wherein said feed means is adapted to receive said strip of Tee-nuts from said table in an orientation rotated through about ninety degrees with said sleeve means extending perpendicular, and said face flanges lying substantially horizontally.

The invention also provides a drum type core carrying a strip of Tee-nut rolled on such a drum.

The invention further comprises such an apparatus wherein the feed table is swingable from a horizontal to a vertical orientation.

The invention further comprises such an apparatus wherein the junction means joining said Tee-nuts into a strip is offset to one side of the central axis of said Tee-nuts, to facilitate operation of said feed means.

The various features of novelty which characterize the invention are pointed out with more particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

FIG. 11 illustrates a further embodiment of Tee-nut support apparatus, in a first position, and, FIG. 12 illustrates the FIG. 11 embodiment in a second position.

DESCRIPTION OF A SPECIFIC EMBODIMENT

Figure 1:
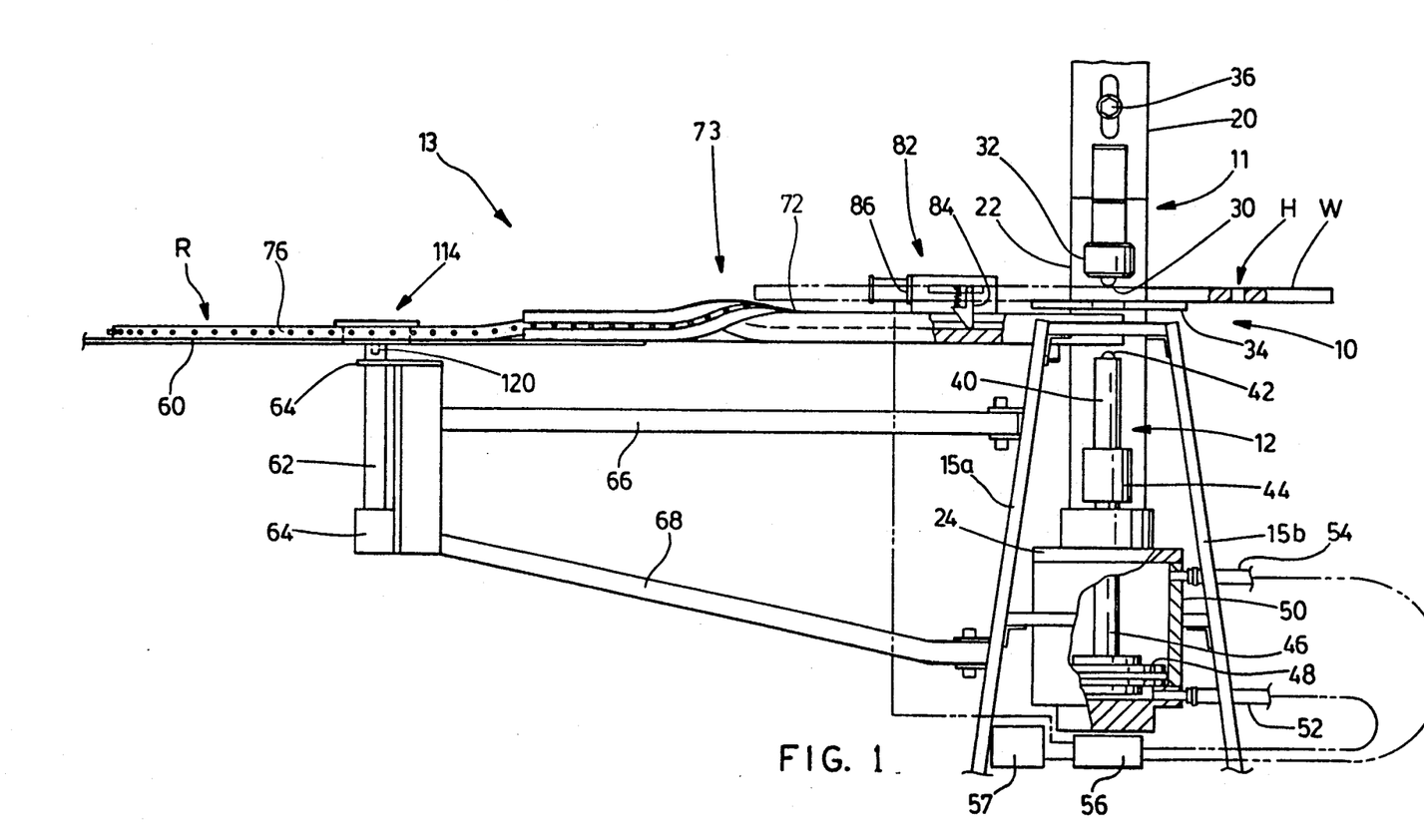
FIG. 1 is a front elevation of a Tee-nut setting apparatus showing the feed apparatus according to the invention, shown partially cut away.

Referring first of all to FIG. 1, one form of Tee-nut setting apparatus is indicated by the general reference arrow 10. It will be seen to comprise a register assembly 11, and a driving assembly 12. The feed assembly according to the invention is shown at 13. All three of the assemblies are supported together on a common stand consisting of four legs 15a, b, c, and d.

It will, of course, be appreciated however that if it was desired to incorporate the apparatus in an already existing production line, then it may be that the legs would be unnecessary, and their illustration here is merely by way of convenience of explanation, since clearly the apparatus could be supported on some other form of structure if desired.

Figures 3, 4, 5:
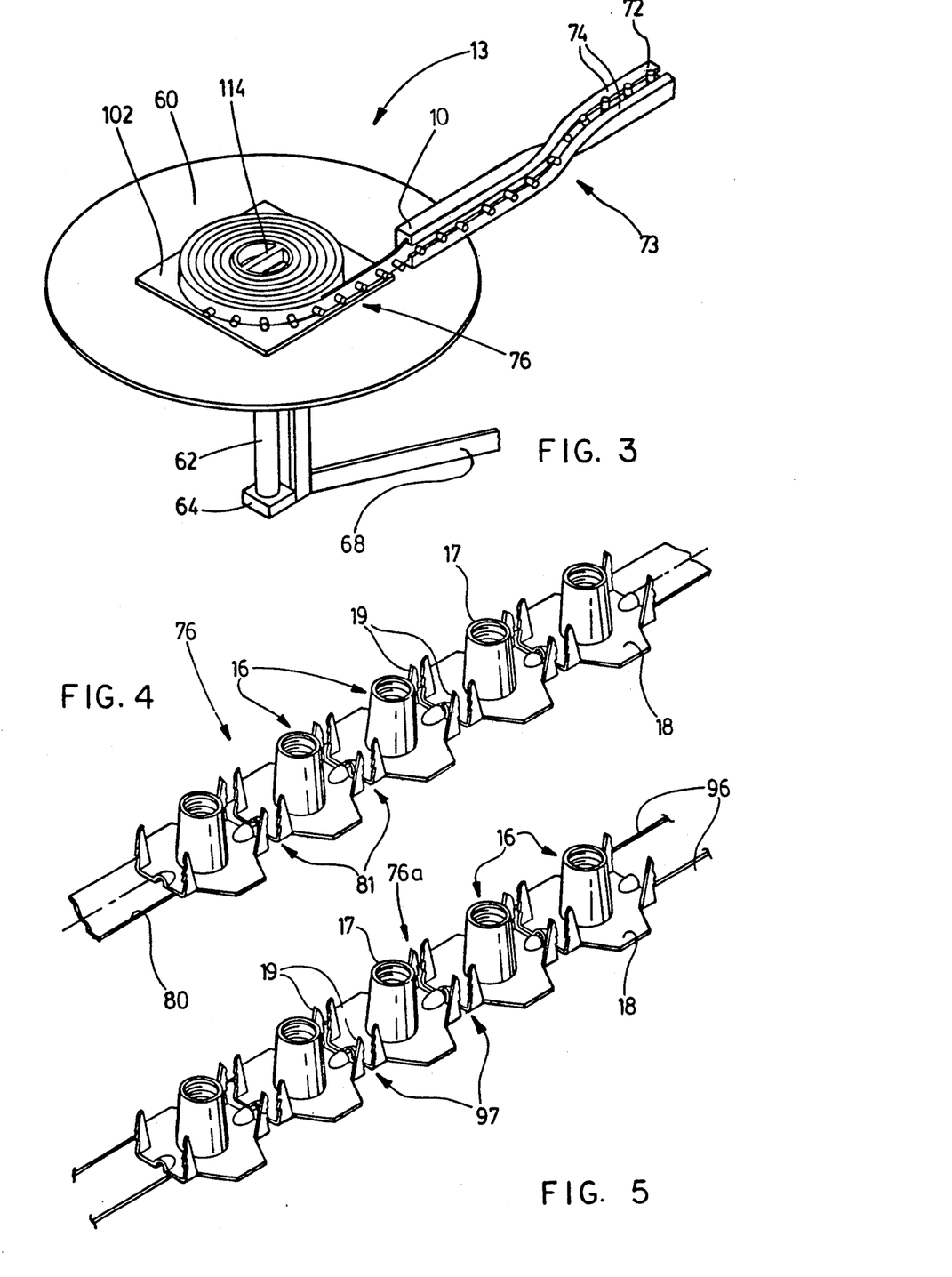
FIG. 3 is a perspective illustration of the feed apparatus of the invention.
FIG. 4 is a perspective illustration of a strip of Tee-nuts, in accordance with one embodiment of the invention.
FIG. 5 is a perspective illustration of a strip of Tee-nuts, in accordance with another embodiment of the invention.

Before describing the apparatus in detail, it will be appreciated that such Tee-nut setting apparatus is used for setting threaded fasteners known as Tee-nuts, in a workpiece, possibly a piece of furniture. Such Tee-nuts are used with many items of furniture such as tables, beds, and the like. Tee-nuts are illustrated in FIG. 4 and 5 indicated generally as 16 and comprises an internally threaded sleeve 17, and an integral face flange 18, and spikes or prongs 19. The workpiece will already be predrilled, at the locations where the Tee-nuts are to be set, at a suitable drill apparatus located elsewhere in the plant, and requiring no description.

Figure 9:
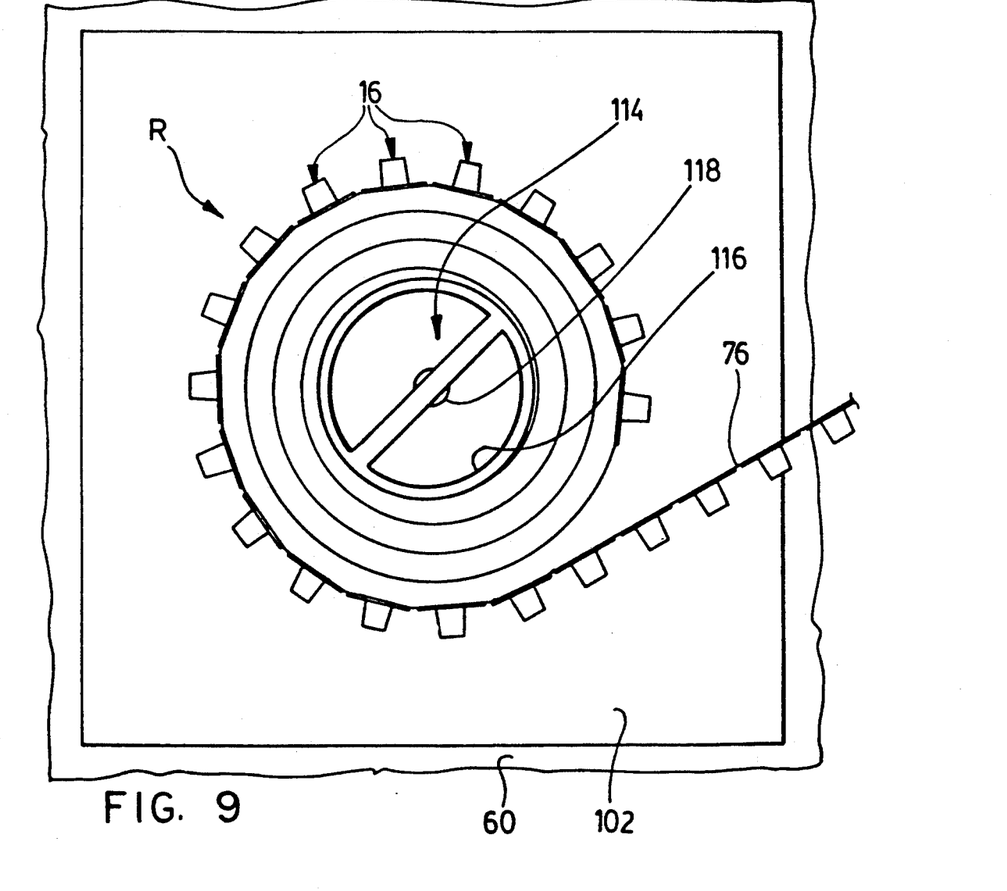
FIG. 9 is a top plan view of a roll of Tee-nuts, and its supporting package, shown on the feed table, which is partially cut away.

As will be described below, in accordance with the invention the Tee-nuts 16 are associated together in an elongated strip by strip forming means, in a manner to be described below and are then formed into a relatively large roll indicated generally as R, as shown generally in FIGS. 3 and 9, described below.

Such a workpiece is indicated as W in FIG. 1 with, for example, pre-drilled holes H, one being indicated in phantom.

A setting apparatus for the purposes of this description has a register assembly indicated generally as 11 which comprises a generally C-shaped frame, comprising an upper horizontal portion 20, a rear vertical portion 22, and a lower horizontal portion 24. The frame is secured by any suitable means such as struts 26, to the legs 15.

Secured at the forward free end of the upper horizontal frame member 20 is a downwardly extending register pin 30, preferably having a tapered or rounded leading end for reasons to be described. The pin has a diameter equal to, or just less than the diameter of the holes H, pre-drilled in the workpiece W and has a length less than the length of such holes H. The holes H have a length which is equal to the thickness of the workpiece W, since the holes H pass entirely through the workpiece, in this embodiment.

At the upper end of the register pin, there is provided an annular anvil or stop ring 32, having a diameter which is larger than the holes H and may be up to in the region of the width of the workpiece W, although this dimension is not critical.

Located below, and on either side of the pin 30, is a rest plate 34, adapted to support the workpiece between operations, if necessary. Rest plate 34 defines an opening 36 therein for reasons to be described below.

Preferably, the register pin 30 and anvil 32 may be adjusted vertically, to accommodate workpieces of different thicknesses. Such an adjustment may be provided by means such as a threaded fastening 36, by means of which the register pin and anvil may be secured to the upper frame member.

The illustrated form of setting apparatus has a driving assembly indicated generally as 12. It will be seen to comprise a rod 40, having at its upper free end a hammer head 42, and a button 43. Rod 40 is secured by means of a releasable coupling 44, to a piston rod 46. Rod 46 is, in turn, connected to a piston 48, located in power cylinder 50.

Typically, cylinder 50 will be a pneumatic cylinder, operated by air pressure supplied by hoses 52 and 54.

The air pressure in hoses 52 and 54 is controlled by means of control valve 56, in turn, controlled, for example, by a foot pedal 57.

The operation of the piston 48 in the cylinder 50 will cause the rod 40 to drive upwardly, and to return downwardly, in a manner described below.

The Feed Assembly

The feed assembly 13 of this apparatus is provided for feeding Tee-nuts to the driving assembly. The feed assembly in this embodiment comprises a generally horizontal disk-like feed table 60, rotatably mounted on a generally vertical shaft 62. Shaft 62 is, in turn, supported, in suitable bearings 64, on the cantilever arms 66, 68. Arms 66 and 68 are, in turn, secured in this embodiment to legs 15a–15c, so that the table 60 is supported for rotation in a horizontal plane to one side of the register assembly 11 and driving assembly 12.

Table 60 could of course be separable from the Tee-nut setting apparatus and supported independently, in any suitable manner.

A feed guide 70 commences at a point above the surface of feed table 60, and merges into slide 72, which extends to a location beneath the rest plate 34, registering with rod 40. The feed guide 70 and slide 72 are secured to legs 15a and 15c, but are not secured to the table 60, so that the table 60 is free to rotate, while the guide 70 and slide 72 remain stationary.

A roll R of Tee-nuts 16 is shown located on the table 60, and the outer free end of the strip is shown extending into the feed guide 70. The feed guide 70 is in the form of a support channel which is adapted to support the Tee-nuts "on edge" in the manner in which the strip will unravel from the roll R. This ensures the smooth, regular, unwinding or unravelling of the strip from the roll during operation.

As mentioned, guide 70 merges into feed slide 72 through a twist portion 73. Slide 72 has a predetermined width, and has shoulders 74–74, enclosing a portion of the channel and defining an upwardly open narrow slot 75 having a width less than said predetermined width of said slide 72.

A strip 76 of Tee-nuts 16, comprising a plurality of individual Tee-nuts 16—16 secured to junction means, in this case a backing strip 80 (FIG. 4), formed into a roll R is supported on table 60, and is then fed from the table into the guide 70 and then into the feed slide 72. A feed mechanism indicated generally as 82 and having, for example, a feed pawl 84 is operated, for example, by a power-operated means such as a cylinder 86, is reciprocal to feed the strip 76 along the slide 72.

It will be noted from FIG. 3 that the roll R of Tee-nuts is positioned on the table 60, with the Tee-nuts on edge and, in this way, the strip 76 of Tee-nuts can be freely unwound from the roll. However, as the end portion of the strip 76 passes along guide 70 and slide 72, it twists in portion 73 through approximately ninety degrees (FIG. 3), so that when the strip of Tee-nuts is in the slide 72, the Tee-nuts are lying with their threaded sleeve portions 17 extending perpendicularly through the slot 75.

Guide 70 and slide 72 are a continuous integral one piece structure, which defines a ninety degree twist portion 73 along its length.

Figure 6:
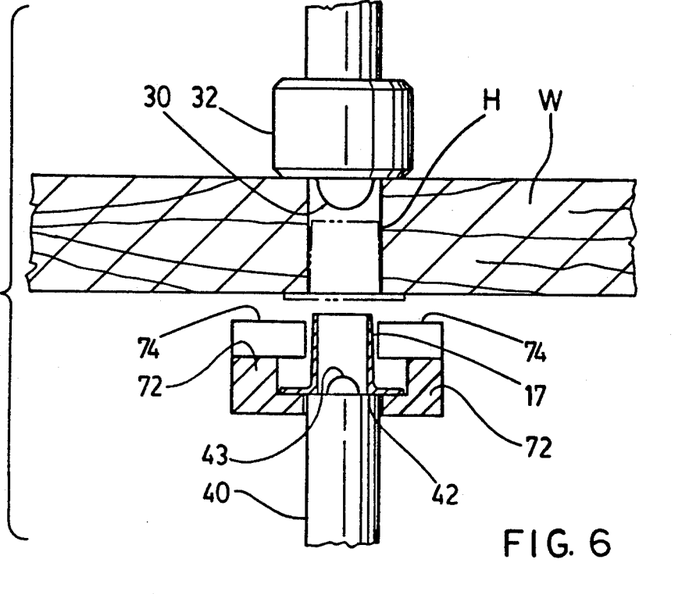
FIG. 6 is a section along line 6—6 of FIG. 7, showing the operation of the setting mechanism.
Figure 7:
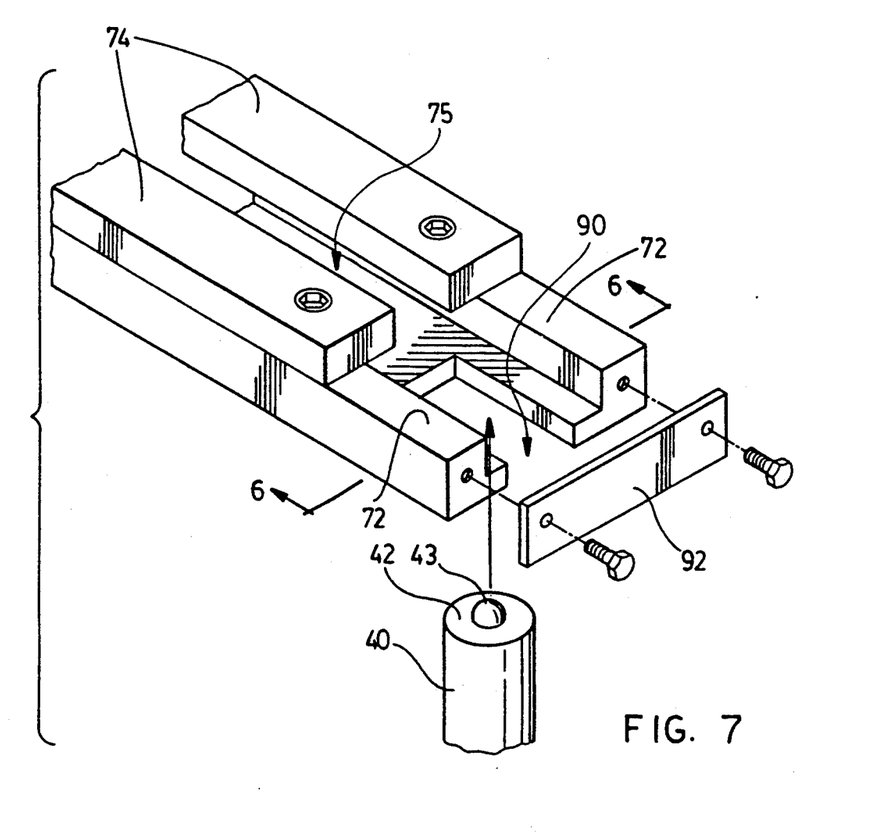
FIG. 7 is a cut-away perspective of the feed channel and drive piston.

At the point where the end of the slide 72 registers with the piston 40, the slide is provided with a downwardly open recess 90, of a sufficient width to admit the rod 40. Immediately above the recess 90, the shoulders 74—74 are removed, so that the endmost Tee-nut is then free of restraint from upward movement (FIGS. 6 and 7).

Slide 72 defines a continuous smooth surface, free of obstruction, along which Tee-nuts in strip 76 can pass smoothly and freely.

An end plate 92 closes the open end of slide 72.

Preferably, the cylinder 86 of the feed mechanism is operated in timed relation to the operation of the piston 48. Such timed operation may be achieved by a separate valve and control, or may be achieved by connecting the valve 56 to the piston 86, so that the air exhausted from piston 48 after completion of its setting stroke, is then supplied to the cylinder 86 to provide a feed stroke. In this way, the feed mechanism will operate alternately with the setting mechanism, and provide a timed sequencing of movement of the strip along the channel of slide 72.

In operation, an operator sets the roll R of Tee-nuts on the table 60 and feeds the strip 76 of Tee-nuts into guide 70 and along the feed slide 72 until the endmost Tee-nut in the strip registers with the rod 40.

He will then place a workpiece W on the table 34, and position it so that a hole H registers with the register pin 30. He will then simply raise the wooden workpiece with both hands, until the register pin 30 enters the hole. He will then operate the foot pedal 56, causing the piston 48 to be driven upwardly, and returned downwardly.

The button 43 on top 42 of the rod 40 will then register with the sleeve portion 17 of the endmost Tee-nut 16, and it will then be torn away from the strip, and driven forcefully upwardly into the hole H in the workpiece W. The spikes on the flange of the Tee-nut 16 will be driven into the workpiece around the hole, and the flange will then impact on the surface of the workpiece.

The operator will then simply lower the workpiece from the register pin 30 and move it until the next hole registers, and he then repeats the operation.

On each return stroke of the piston 48, air is vented via valve 56 to cylinder 86, thereby causing the strip to advance by an increment of one Tee-nut.

It will thus be seen that in accordance with the invention, a rotary support for a strip of Tee-nuts is provided in which many of the problems inherent in earlier designs is overcome.

the problem of handling, sorting, and feeding loose Tee-nuts is overcome by the provision of Tee-nuts formed into a rolled strip, and by the provision of the rotating table 60, so that the Tee-nut strip can simply be rolled into a roll and placed with the Tee-nuts on edge, and unwound and fed progressively to the setting apparatus.

It will thus be seen that the invention offers significant economies and significant improvements in operation over earlier types of apparatus.

The Tee-nut strip illustrated in FIG. 4 consists of a series of Tee-nuts 16 adhesively bonded to a backing strip or wet 80 of paper, plastic, or the like. This has been found to be effective and reliable in practice.

It will be noted that the web 80 has a central axis A, which is offset to one side of the Tee-nuts 16. This leaves recesses 81 between adjacent Tee-nuts, along the one side of the strip, which greatly facilitates the operation of the feed mechanism 82, and pawl 84. Pawl 84 is free to engage in recess 81 on one side of each pair of Tee-nuts 16, without interference from the web 80.

Alternatively, the Tee-nut strip 76a may be formed as shown in FIG. 5. In this embodiment, the Tee-nuts 16 are formed into a strip by being welded to wires 96—96. This form of strip, while being somewhat more costly to manufacture, may be desirable, in some circumstances, where it is required to provide a more secure form of connection between the Tee-nuts.

The two wires are offset to one side of the Tee-nuts 16, so as to leave a recess 97 on the other side of the Tee-nuts, free for engagement by the feed mechanism.

In either case such strips of Tee-nuts would normally be packaged as in roll R (FIG. 8), with radial fastening means or shrink wrapping 100 securing the roll for handling. A back sheet of cardboard 102 would normally be secured to one side, to facilitate handling and packing in packing cases. Typically the roll defines a central opening, and backsheet 102 would have a similar opening and the fastening means 100 would enclose them as shown.

Figure 8:
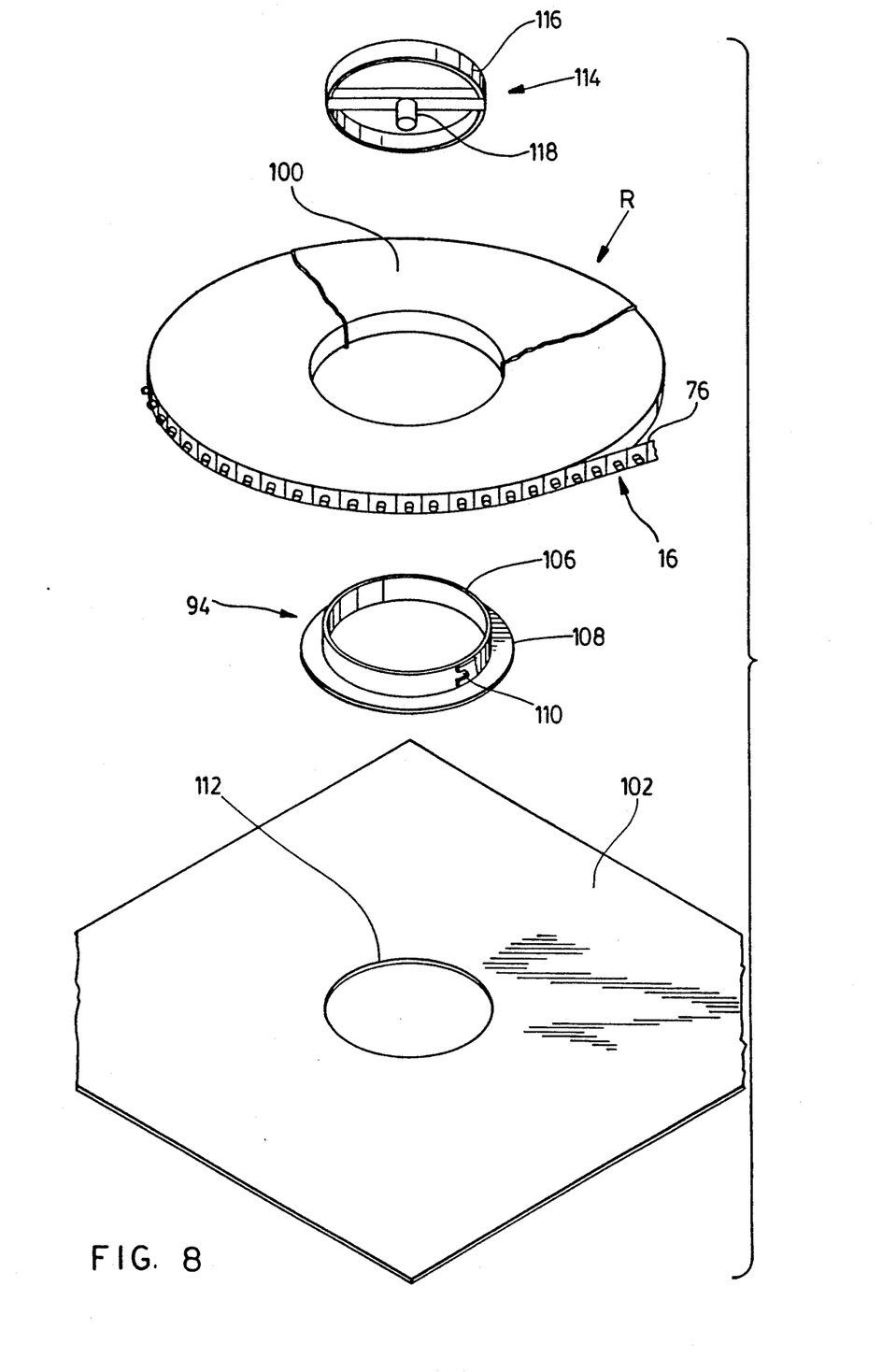
FIG. 8 is an exploded perspective illustration of a package of rolled Tee-nuts.

Such a Tee-nut package is shown in more detail in FIG. 8. It will be seen in this illustration, to comprise a roll R formed of a strip 76 of Tee-nuts. The roll R in this case may be formed around a core indicated generally as 94, comprising a central collar member 106 and annular flange 108. An abutment or notch 110 may be formed on collar 106. The purpose of this would be to assist in locating the first of the Tee-nuts in the roll R, and hold it on the collar 106, while the remaining strip of Tee-nuts is rolled thereon.

A cardboard or other base panel 102, in this case being shown of a rectangular shape, supports both the collar 104 and the roll R. A central register opening 112 is formed in panel 102.

The package consisting of the roll R, the collar 104 and the base 102 may be secured by shrink wrap 100 or any other suitable means such as straps or the like (not shown).

In use, a registering boss 114 (FIG. 8) is provided, with the feed apparatus. The registering boss 114 comprises an annular ring portion 116 and a central register pin 118.

It is sized so as to fit within the interior of collar 104 of roll R. The pin 118 is intended to be received in a suitable recess 120, formed in column 62 (FIG. 1).

In this way, the entire package of Tee-nuts may simply be placed in position on the table, and any wrapping or strapping, or the like removed.

The registering boss 114 is then positioned, with the pin 118 in the recess 120.

Figure 2:
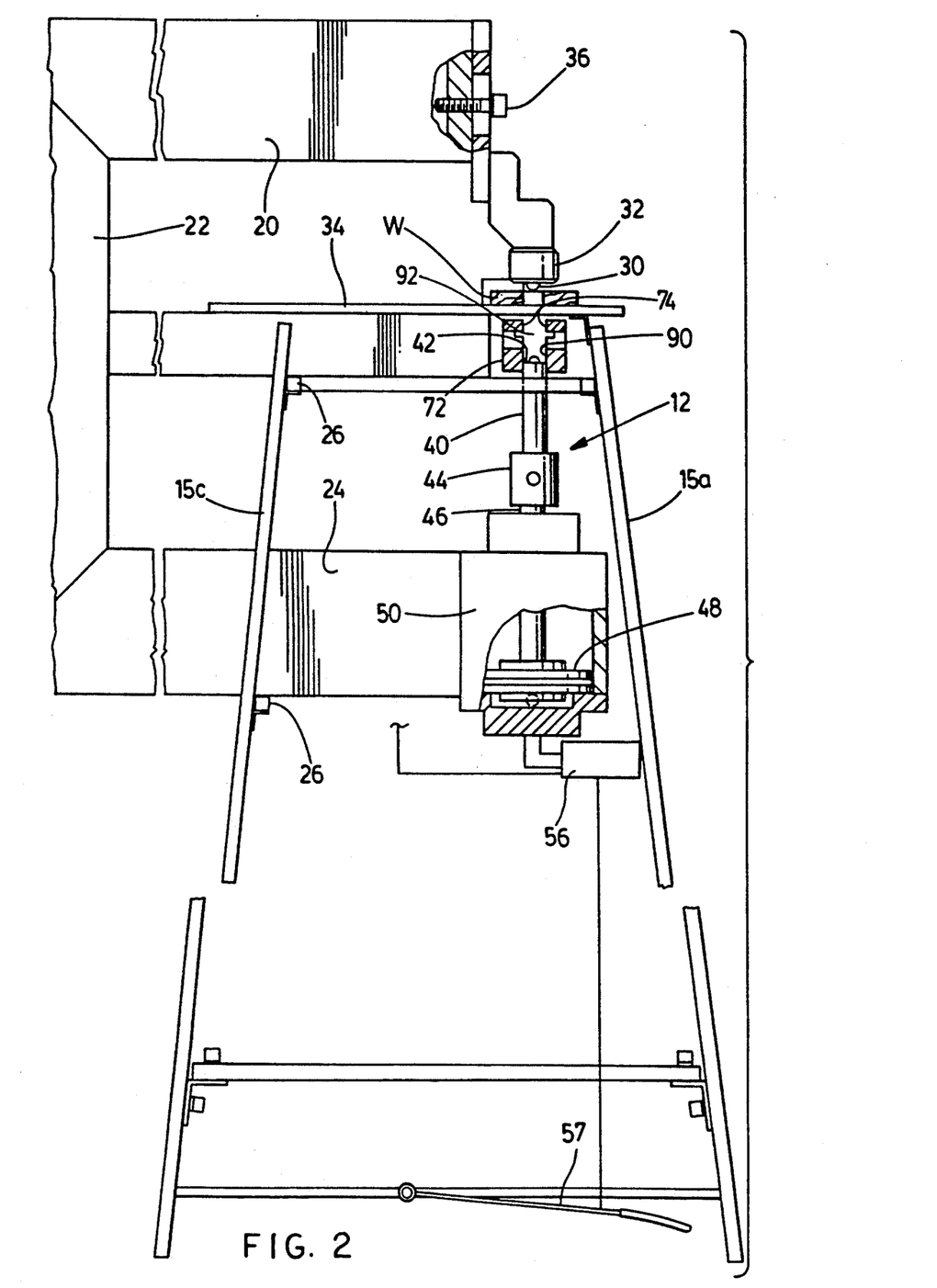
FIG. 2 is a side elevation of a portion of a Tee-nut setting apparatus partially cut away.

The outer end of the strip 76 of Tee-nuts from the roll 98 may then be unwound and threaded as shown in FIGS. 1 and 2, and will simply progressively unwind, with the table rotating in the manner described above.

It will of course be appreciated that the Tee-nut strip itself may be formed into a roll in several ways. Either the sleeve portions 17 may extend inwardly with respect to the roll (not shown) or they may extend outwardly with respect to the roll (FIGS. 3, 8 and 9).

In either case, it is considered desirable to provide a certain small gap between the individual Tee-nuts. The purpose is to ensure a clean separation between the endmost Tee-nut and the next adjacent Tee-nut in the strip and to permit flexing of the strip to form a roll. Typically, the thickness of the flanges 18 will have a predetermined thickness. Preferably, the gap between adjacent Tee-nuts is a small fraction of the thickness of the flanges 18. The small gaps between the Tee-nuts depicted in FIGS. 4 and 5 are exaggerated so that the gaps and other detailed features of the Tee-nuts can be clearly shown.

Figure 10:
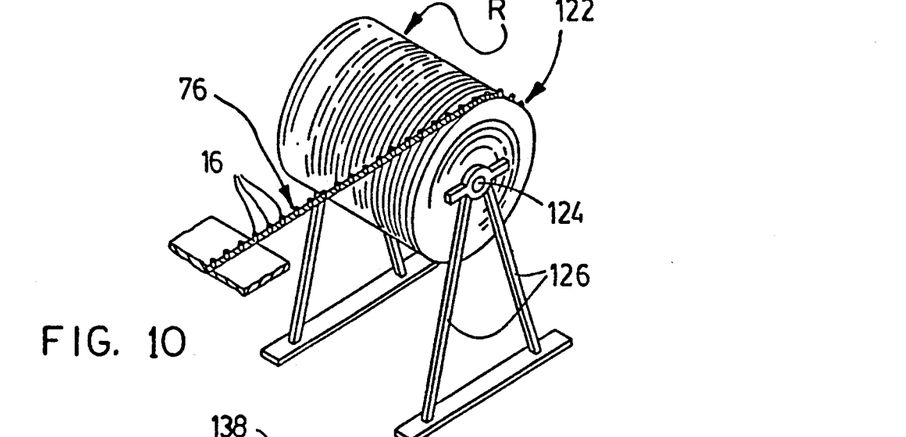
FIG. 10 is a schematic perspective of a further alternate embodiment of a roll of Tee-nuts.

In accordance with a further embodiment illustrated in FIG. 10, the strip 76 of Tee-nuts 16 may be rolled on a drum. Such a drum is indicated generally as 122. It is of cylindrical shape and may be formed of sheet metal, plastic, or paper board material. It is mounted on a generally horizontal shaft 124 can rotate on legs 126 or drum 122 can rotate on shaft 124. In this case the strip 76 of Tee-nuts 16 will unravel from the drum with the Tee-nuts already oriented with their sleeves 17 directed perpendicular and can be received directly in a modified slide without a twist (not shown).

The feed apparatus is of course equally applicable to many types of setting apparatus whether of the older downward plunger type or the newer upward plunger type.

Figures 11, 12:
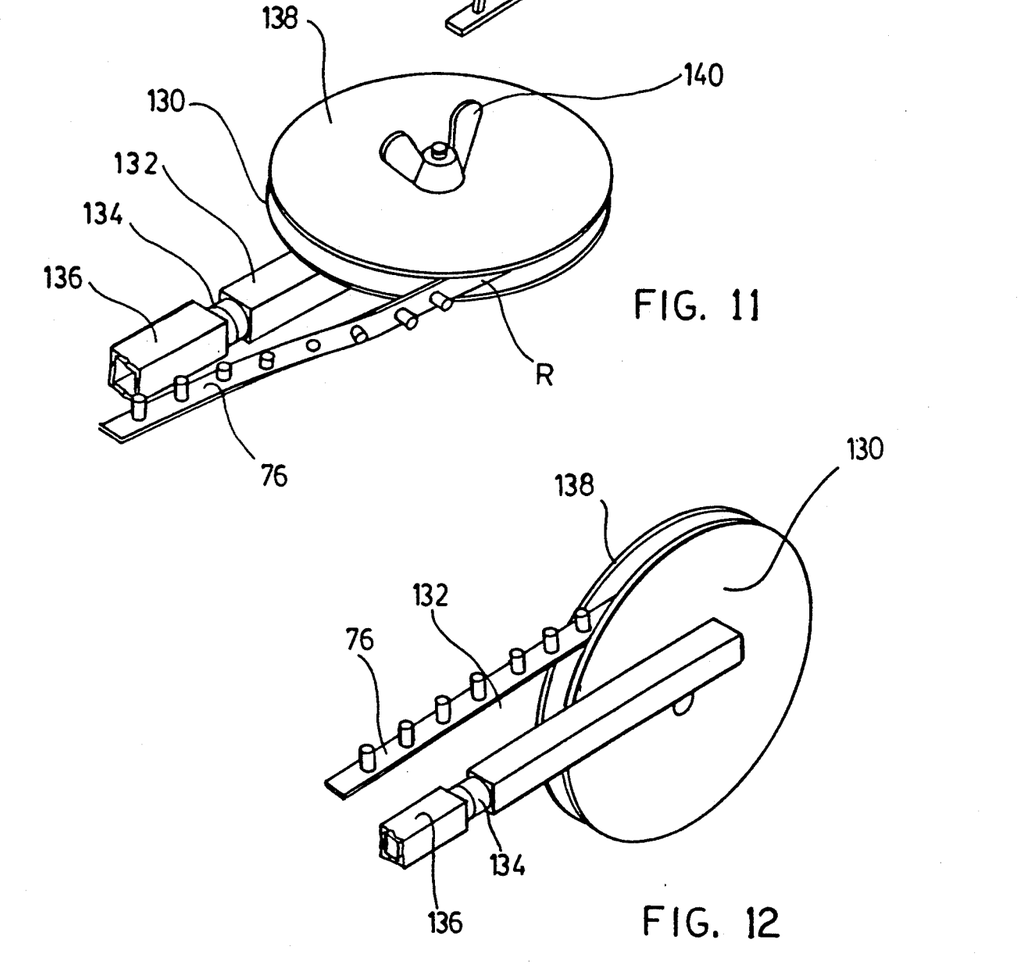

A further alternate form of feed mechanism is illustrated in FIGS. 11 and 12. In this case, a table 130 is rotatably supported on a first arm 132. Arm 132 itself is rotatably coupled, by bearing 134, to fixed arm 136. Thus table 130 can be swung from a horizontal, to a vertical position. A cover plate 138, and bolt or nut 140 are provided to hold a roll R of Tee-nuts on table 130. It will be seen that once a roll R of Tee-nuts has been secured on table 130, by plate 138, the table can be swung through ninety degrees (FIG. 12). Thus the strips of Tee-nuts will unravel directly into a modified slide without a twist (not shown) without having to twist through ninety degrees.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. Tee-nut feed apparatus for use with Tee-nut setting apparatus for setting Tee-nuts in a workpiece, a plurality of said Tee-nuts being joined to one another to form a continuous strip of Tee-nuts and being wound into a roll from which they may be progressively unwound, said Tee-nuts including sleeve portions adapted to be embedded in a workpiece and integral face flanges, extending from said sleeve portions and adapted to lie on a surface of said workpiece and including continuous breakable means secured to said face flanges of said plurality of Tee-nuts to join said Tee-nuts into said strip, and said setting apparatus having driver means operable to reciprocate to and fro towards and away from a workpiece, said feed apparatus comprising;

a horizontal rotatable support table for supporting said roll of Tee-nuts, said Tee-nuts in said roll being adapted to lie with edges of said face flanges lying on said rotary table with said sleeves oriented substantially horizontally;

bearing means for said table whereby said table is rotatably operable to permit said roll to progressively unwind said strip of Tee-nuts;

a guide channel for guiding said strip of Tee-nuts along a feed path to said driver means wherein said guide channel is adapted to receive said strip of Tee-nuts from said table in said orientation and wherein said Tee-nuts are rotated through about ninety degrees with said sleeve means extending perpendicular, and said face flanges lying substantially transversely; and, feed means operable to move said strip along said channel whereby operation of said driver means will separate an endmost Tee-nut from said strip and will drive said endmost Tee-nut into said workpiece.

2. Tee-nut feed apparatus as claimed in claim 1 wherein said sleeve portions define a longitudinal axis, and said face flanges lying in an axis transverse to said longitudinal axis, and continuous breakable means secured to said Tee-nuts and joining said Tee-nuts, to form the same into a strip, said continuous breakable means being adapted to flex between adjacent said Tee-nuts whereby said strip may be formed into a roll to be supported on said table.

3. Tee-nut feed apparatus as claimed in claim 2 wherein said continuous breakable means joining said plurality of Tee-nuts comprises a continuous length of a breakable web defining a central axis, said axis being offset to one side of said plurality of Tee-nuts.

4. Tee-nut feed apparatus as claimed in claim 3 including a back panel on one side of said roll adapted to be supported on said table.

5. Tee-nut feed apparatus as claimed in claim 3, and wherein said face flanges of said Tee-nuts are spaced apart from one another by a small distance, and wherein said face flanges are formed of a material having a predetermined thickness, and wherein said distance is a small fraction of said thickness.

6. Tee-nut feed apparatus as claimed in claim 2, wherein said continuous breakable means joining said Tee-nuts comprises a pair of continuous wires secured to said face flanges on opposite sides of said sleeve means and offset to one side of said Tee-nuts, said wires being breakable between said Tee-nuts.

7. Tee-nut feed apparatus for use with Tee-nut setting apparatus for setting Tee-nuts in a workpiece, a plurality of said Tee-nuts being joined to one another to form a continuous strip of Tee-nuts and being wound into a roll from which they may be progressively unwound, and said setting apparatus having driver means operable to reciprocate to and fro towards and away from a workpiece, said feed apparatus comprising;

a rotatable support table for supporting said roll of Tee-nuts, said rotatable support table being secured on a rotatable arm, and bearing means for said arm whereby said table is rotatable between horizontal and vertical positions, and means for securing a said roll of Tee-nuts to said table;

said table being rotatably operable to permit said roll to progressively unwind said strip of Tee-nuts;

a guide channel for guiding said strip of Tee-nuts along a feed path to said driver means; and, feed means operable to move said strip along said channel whereby operation of said driver means will separate an endmost Tee-nut from said strip for driving said endmost Tee-nut into said workpiece.

* * * * *